2,707,685

SULFUR COMPOSITION

Raymond B. Seymour, Emmaus, and Walter R. Pascoe, Reading, Pa., assignors to The Atlas Mineral Products Company of Pennsylvania, Mertztown, Pa., a corporation of Pennsylvania No Drawing. Application January 6, 1954,
Serial No. 402,605

1 Claim. (Cl. 106—70)

This invention relates to a sulfur composition having improved handling properties by way of contrast with sulfur per se.

When heated to a temperature of about 160° C. molten sulfur commences to thicken markedly. This is obviously disadvantageous where it is desired to use higher temperatures and still have no substantial reduction in viscosity. Further, molten sulfur has a tendency to froth or bubble which results in a reduction in the density of the sulfur.

In accordance with this invention the above discussed problems have been solved by the addition of 2-mercaptobenzothiazole to sulfur. The 2-mercaptobenzothiazole will be added to the sulfur in an amount of from 0.01% to 1.0% by weight of the sulfur.

In forming the sulfur composition of this invention, the sulfur is heated to place it in a molten state using, for example, a temperature range of from about 120 to 170° C. The 2-mercaptobenzothiazole is then added and the molten mass is stirred.

The composition of this invention will be further clarified by the following examples:

Example 1

| | Pounds |
|---|---|
| Sulfur | 100 |
| 2-Mercaptobenzothiazole | .01 |

Example 2

| | Pounds |
|---|---|
| Sulfur | 100 |
| 2-Mercaptobenzothiazole | .1 |

Example 3

| | Pounds |
|---|---|
| Sulfur | 100 |
| 2-Mercaptobenzothiazole | .5 |

Example 4

| | Pounds |
|---|---|
| Sulfur | 100 |
| 2-Mercaptobenzothiazole | 1.0 |

The sulfur composition in accordance with this invention has, for example, great utility as a jointing composition for, by way of example, pipe. Since the use of the composition in accordance with this invention as a jointing composition illustrates the great advantages which have been achieved, this use will be considered in some detail.

Sulfur alone and together with a filler, such as barytes, silica and carbon, is well known as a jointing composition. It is also known to add a plasticizer to improve the ductility of the sulfur jointing composition.

Despite the improvements which have heretofore been made in sulfur jointing compositions, the viscosity of the sulfur made the jointing composition hard to handle and tended to cause the formation of voids in the joint. The tendency to froth or bubble resulted in reduction of density of the cast joint. The use of the sulfur composition in accordance with this invention, either alone or together with other conventional ingredients, solves these problems and results in a superior joint.

The sulfur composition in accordance with this invention may also include other ingredients conventionally found in such compositions. Thus, for example, a filler such as silica, asbestos, carbon or slate flour can be added in conventional amounts of from about 15 to 150% by weight of the sulfur. A plasticizer such as thiokol, benzothiazole disulfide, dodecyl disulfide, tri-isobutylene disulfide or tetramethylthiuram disulfide may also be added in conventional amounts of from about 0.2% to about 15% by weight of the sulfur.

The following tests further serve to illustrate this invention and its utility as a jointing composition:

Test 1

A mixture of 61 parts sulfur and 39 parts graded silica aggregate had a viscosity of 550 cp. at 140° C. and became very thick when heated up to 160° C. To this mixture was added 0.025 parts of 2-mercaptobenzothiazole and the viscosity of this mixture was 370 at 140° C. Increasing the 2-mercaptobenzothiazole to .05 part resulted in a viscosity of 310 at 140° C.; with 0.1 part of 2-mercaptobenzothiazole a viscosity of 190 cp. at 140° C. and with 0.3 parts a viscosity of 130 cp. at 140° C. All of the thus formed compositions containing 2-mercaptobenzothiazole were heated up to 180° C. without appreciably increasing the viscosity of the mixture.

Test 2

At 140° C. a mixture of 60 parts sulfur, 38 parts graded silica and 2 parts carbon had a viscosity of 725 cp. In the presence of .01 part 2-mercaptobenzothiazole the viscosity was 625 cp. at 140° C.; in the presence of 0.1 part 2-mercaptobenzothiazole it was 550 cp. at 140° C. and in the presence of 0.2 part 2-mercaptobenzothiazole it was 475 cp. at 140° C. In none of these mixtures containing 2-mercaptobenzothiazole tested did the viscosity increase noticeably when heated up to 180° C., while the mixture without 2-mercaptobenzothiazole commenced to thicken markedly at 160° C.

Test 3

A mixture of 59.2 parts sulfur, 37.7 parts graded silica, 1.8 parts carbon and 1.3 parts thiokol had a viscosity of 900 cp. at 140° C. In the presence of .025 parts 2-mercaptobenzothiazole the viscosity was 710 cp. at 140° C. In the presence of .25 parts 2-mercaptobenzothiazole the viscosity was 480 cp. at 140° C. In the absence of any 2-mercaptobenzothiazole the product bubbled badly and could not be used to form a dense cement when it was poured. Further, it thickened when heated above 140° C. but in the presence of 2-mercaptobenzothiazole the product could be heated up until the decomposition point of the thiokol without undesirable thickening.

Test 4

A mixture was prepared containing 57.7 parts sulfur, 36.6 parts graded silica, 1.8 parts carbon, 1.3 parts sodium silicofluoride, and 2.0 parts sodium chloride. This material frothed and bubbled badly and could not be used to form a proper joint because of the resultant porosity. The addition of 0.01 parts of 2-mercaptobenzothiazole reduced the viscosity from 800 to 650 cp. at 140° C. and made the mix bubble-free. The addition of 0.1 part 2-mercaptobenzothiazole reduced the viscosity to 400 cp. at 140° C.

Test 5

A jointing composition containing 55 parts sulfur, 4 parts carbon, 41 parts graded silica aggregate had a viscosity of 650 cp. at 140° C. This was reduced to 425 cp. by the addition of .025 part of 2-mercaptobenzothiazole. The addition of 0.1 part 2-mercaptobenzothiazole reduced the viscosity to 350 cp.

Test 6

A jointing composition containing 65 parts sulfur, 2 parts carbon, 2 parts thiokol and 31 parts graded silica aggregate was very thick and bubbled and frothed. As a result, castings of this material were porous and full of voids. The addition of 0.25 part 2-mercaptobenzothiazole reduced the viscosity to 500 cp. at 140° C. and reduced the frothing and bubbling to the extent that a dense void-free casting was obtained.

Test 7

A jointing composition containing 70 parts sulfur, and 30 parts carbon filler had a viscosity of 350 cp. at 140° C. and the viscosity increased greatly when the product was heated above 160° C. The addition of 0.1 part of 2-mercaptobenzothiazole reduced the viscosity to 120 cp. and the viscosity did not change essentially when the product was heated as high as 180° C.

Test 8

A jointing composition containing 60.2 parts sulfur, 37.7 parts graded silica aggregate, 1.8 parts carbon flour and 0.3 part benzothiazole disulfide had a viscosity of 750 cp. at 140° C. and became quite thick when heated to 160° C. It had some utility due to its ductility but it was impossible to secure a void-free casting. The addition of 0.2 2-mercaptobenzothiazole caused reduction in viscosity to 320 cp. at 140° C. As a result, no voids were present in the casting since the product did not froth or bubble and it did not thicken when heated above 160° C. at temperatures as high as 180° C.

As shown in the following table, sulfur was heated at 170, 180 and 200° C. in the presence of 0-1% 2-mercaptobenzothiazole and the viscosity was determined in centipoises at each of these temperatures. Whereas, sulfur at 180 or 200° C. is so thick that it is almost impossible to pour, the addition of 2-mercaptobenzothiazole made the material very fluid.

| Temperature, ° C. | Percent by weight of 2-mercaptobenzothiazole | | | | | |
|---|---|---|---|---|---|---|
| | 0 | 0.025 | 0.05 | 0.1 | 0.5 | 1.0 |
| | Viscosity | Viscosity | Viscosity | Viscosity | Viscosity | Viscosity |
| 170 | 2,500 | 550 | 425 | 170 | 130 | 80 |
| 180 | 25,000 | 14,000 | 3,500 | 950 | 170 | 110 |
| 200 | 40,000 | 18,000 | 10,000 | 2,500 | 350 | 200 |

It is not desired to be limited except as set forth in the following claim, the above description being by way of illustration only.

What is claimed is:

A sulfur composition comprising sulfur and 2-mercaptobenzothiazole, the 2-mercaptobenzothiazole being present in an amount of from about 0.01 to about 1% by weight of the sulfur.

No references cited.